B. M. LUPTON, Jr.
ROTARY ENGINE.
APPLICATION FILED DEC. 22, 1916. RENEWED MAR. 31, 1921.

1,393,802.

Patented Oct. 18, 1921.

Inventor
Benjamin M Lupton Jr
by his Attorney
John R. Nolan

B. M. LUPTON, Jr.
ROTARY ENGINE.
APPLICATION FILED DEC. 22, 1916. RENEWED MAR. 31, 1921.

1,393,802.

Patented Oct. 18, 1921.

Inventor
Benjamin M. Lupton Jr.
by his Attorney
John F. Nolan

B. M. LUPTON, Jr.
ROTARY ENGINE.
APPLICATION FILED DEC. 22, 1916. RENEWED MAR. 31, 1921.

1,393,802.

Patented Oct. 18, 1921.

Inventor.
Benjamin M. Lupton Jr.
by his Attorney
John T. Nolan

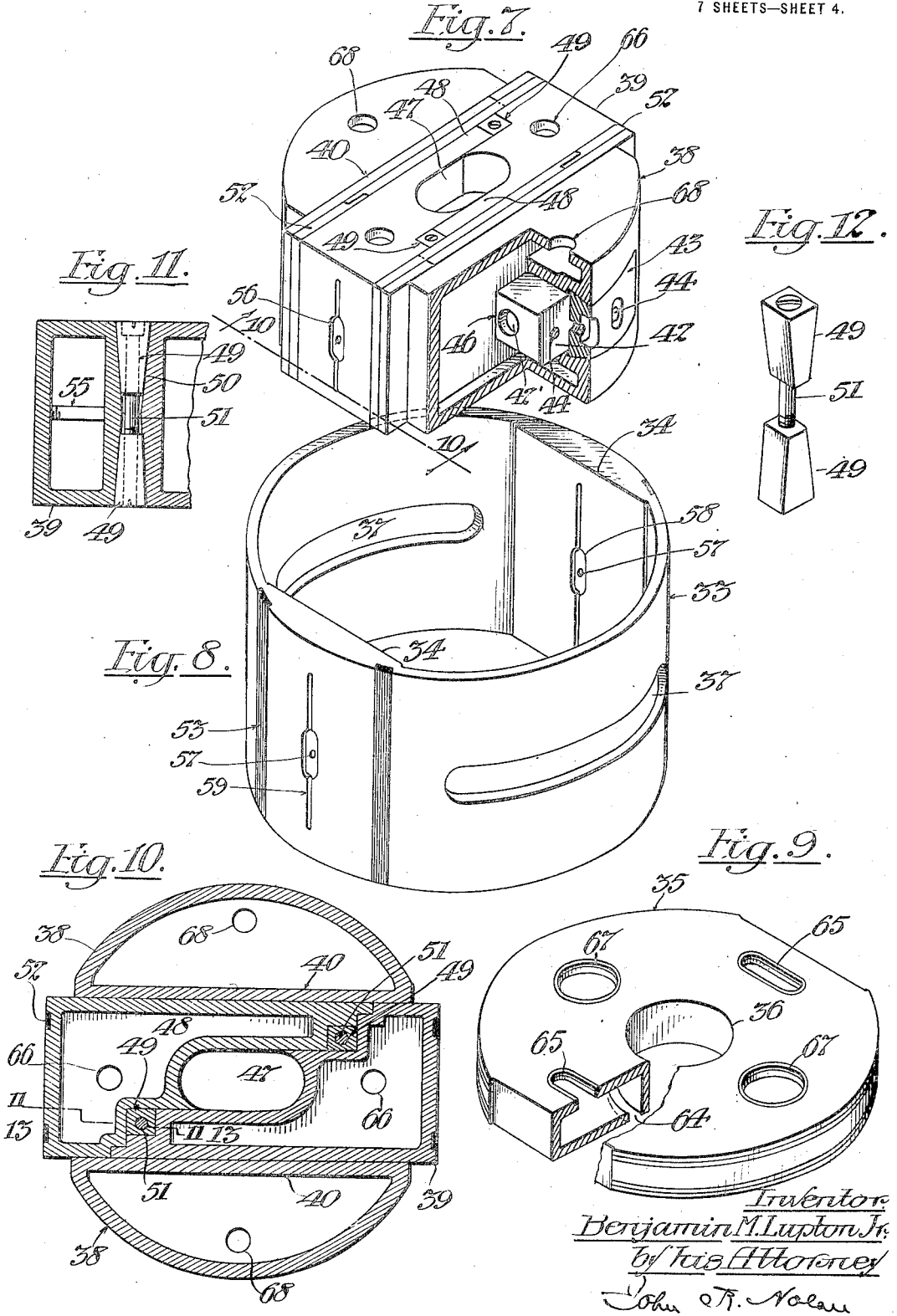

B. M. LUPTON, Jr.
ROTARY ENGINE.
APPLICATION FILED DEC. 22, 1916. RENEWED MAR. 31, 1921.
1,393,802.
Patented Oct. 18, 1921.
7 SHEETS—SHEET 5.
*Fig.13.*
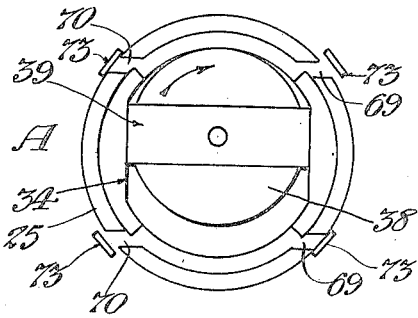
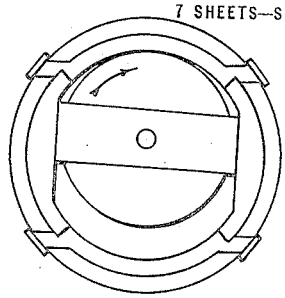
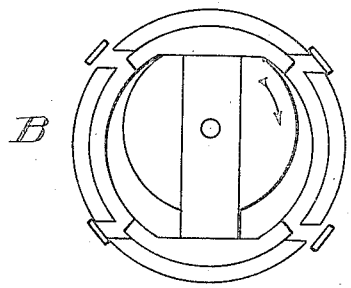
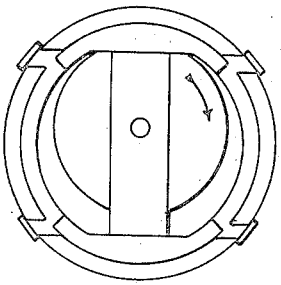
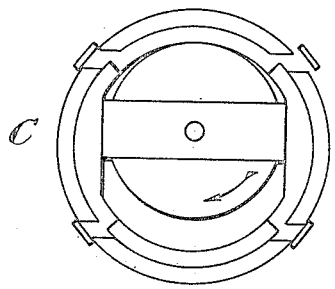
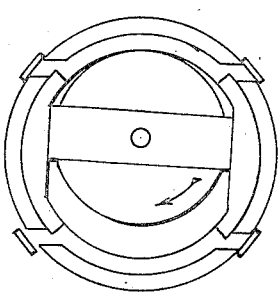
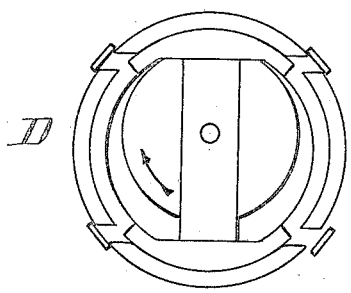
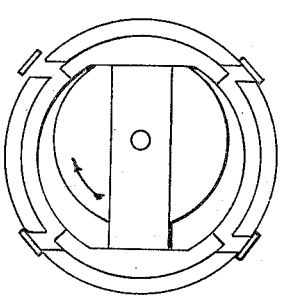
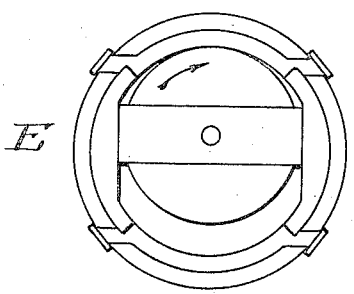
Inventor
Benjamin M. Lupton Jr.
by his Attorney
John A. Nolan B. M. LUPTON, Jr.
ROTARY ENGINE.
APPLICATION FILED DEC. 22, 1916. RENEWED MAR. 31, 1921.

1,393,802.

Patented Oct. 18, 1921.
7 SHEETS—SHEET 6.

Inventor
Benjamin M. Lupton, Jr.
by his Attorney.
John F. Nolan

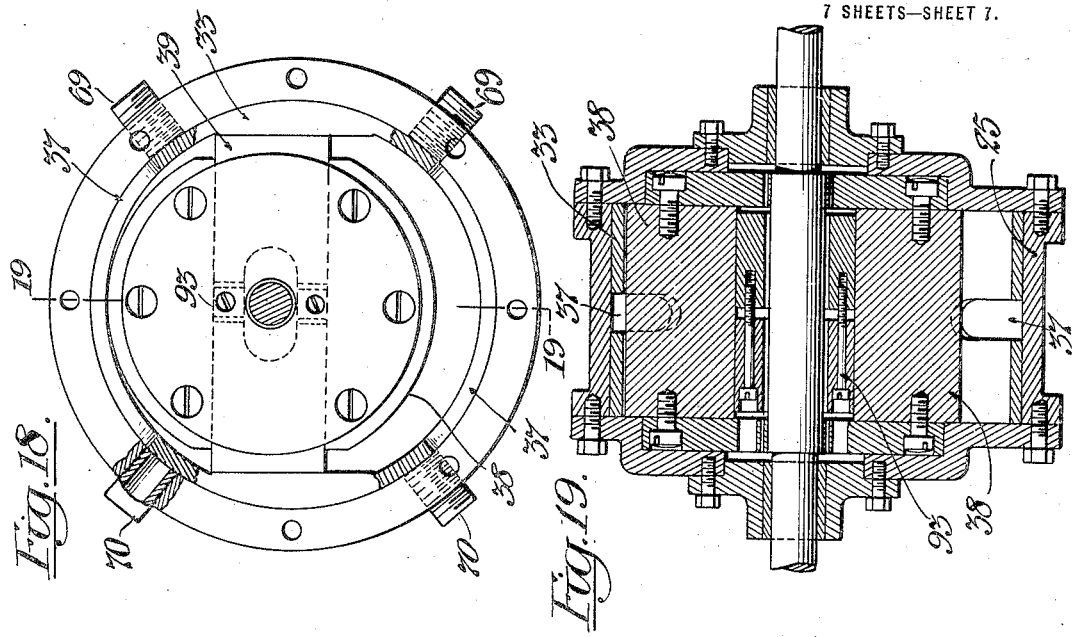
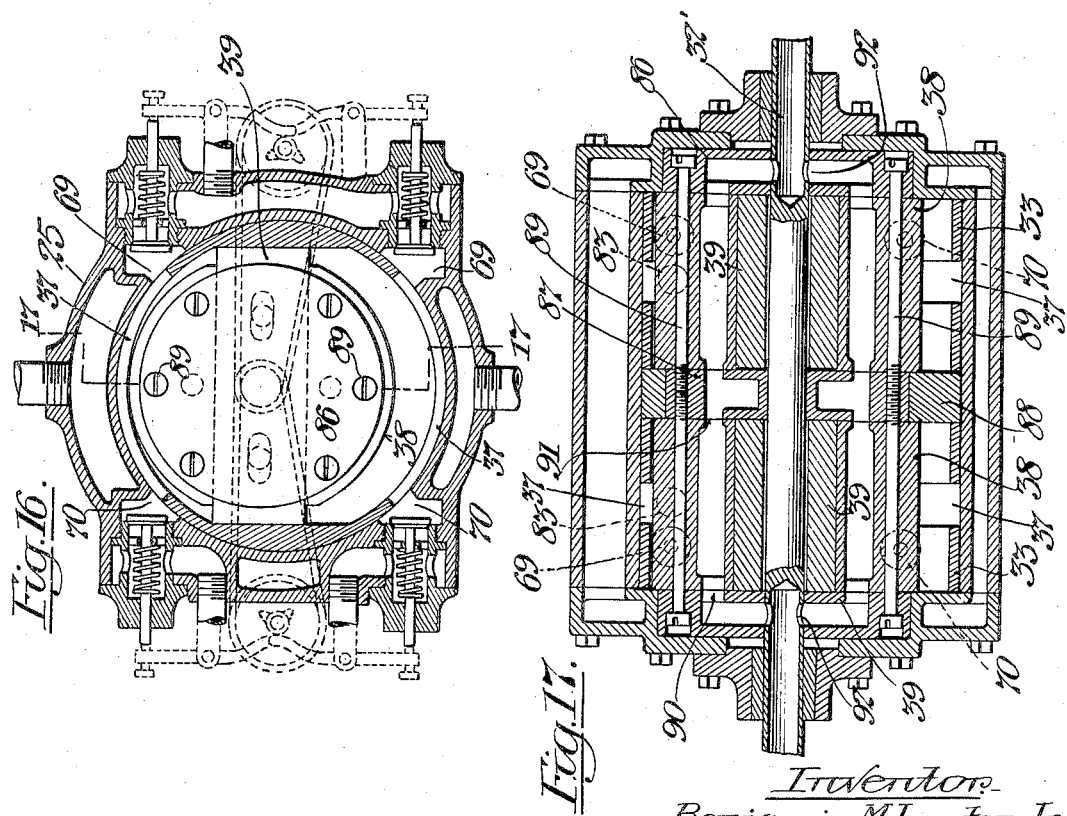

UNITED STATES PATENT OFFICE.

BENJAMIN M. LUPTON, JR., OF JERSEY CITY, NEW JERSEY.

ROTARY ENGINE.

1,393,802.      Specification of Letters Patent.      Patented Oct. 18, 1921.

Application filed December 22, 1916, Serial No. 138,360. Renewed March 31, 1921. Serial No. 457,423.

*To all whom it may concern:*

Be it known that I, BENJAMIN M. LUPTON, Jr., a citizen of the United States, and resident of Jersey City, in the county of Hudson and State of New Jersey, have invented certain new and useful Improvements in Rotary Engines, of which the following is a specification.

This invention relates to that class of rotary engines (including motors, compressors and pumps of various kinds) wherein a casing and relatively rotatable piston members are employed; having reference especially though not exclusively, to engines, such, for example, as internal combustion or steam engines, wherein an expansible fluid is employed as the motive agent.

The object of my invention, generally stated, is the provision of a rotary engine combining the important factors of simplicity of construction and high efficiency, and particularly such an engine wherein the rotary piston and its associated elements are so constructed and arranged in coöperative relation to each other and to fluid admission and discharge ports as to effect and maintain the steady and sustained operation of the engine.

My invention, broadly considered, comprehends a rotary engine embodying a suitable supporting element, parallel guides mounted for relative rotation therein, provision for the admission and discharge of a fluid, a piston comprising a body mounted for relative rotation between and eccentrically of said guides, and comprising also a member mounted to slide in said body transversely thereof, with the respective ends of the member in sliding contact with said guides, whereby during the relative rotary and sliding motions of the piston and guides the internal chambers are caused to vary in capacity progressively. In the case of an internal combustion engine the chambers constitute compression and expansion spaces for an explosive mixture of air and gas; suitable means being provided for the ignition of the compressed mixture at predetermined intervals.

The invention more specifically stated, comprehends a rotary engine of the general character indicated, wherein the supporting element is constituted by a casing having suitably-located ports for the admission and discharge of a fluid, and wherein the parallel guides for the sliding piston member are embodied in a cylinder which is rotatably mounted within and concentrically of the bore of the casing, said cylinder having therein circumferential passages which periodically establish communication between the interior of the cylinder and the respective ports of the casing during the relative rotary and sliding motions of the cylinder and its associated piston.

The invention also comprises various novel features of construction and combinations of parts which will be hereinafter described and claimed.

In the annexed drawings—

Fig. 7 is a sectional perspective view of the piston.

Fig. 8 is a perspective view of the rotary guide cylinder for the sliding member of the piston.

Fig. 9 is a sectional perspective view of one of the chambered end heads for said cylinder.

Fig. 10 is a section through the piston, as on the line 10—10 of Fig. 7.

Fig. 11 is a vertical section through a portion of the sliding piston member, showing adjusting wedges therefor, as on the line 11—11 of Fig. 10.

Fig. 12 is a detached perspective view of the adjusting wedges and their actuating screw.

Fig. 13 is a series of diagrams illustrative of successive relative positions of the piston and associated parts during the operation of the engine, as hereinafter pointed out.

Fig. 16 is a transverse vertical section of a modification of the engine illustrating a plurality of working units.

Fig. 17 is a longitudinal vertical section of the same, as on the line 17—17 of Fig. 16.

Fig. 18 is an end elevation, partly in section, of a pneumatic, steam or hydraulic motor (or pump) embodying the principle of my invention.

Fig. 19 is a longitudinal vertical section, as on the line 19—19 of Fig. 18.

Figure 1:
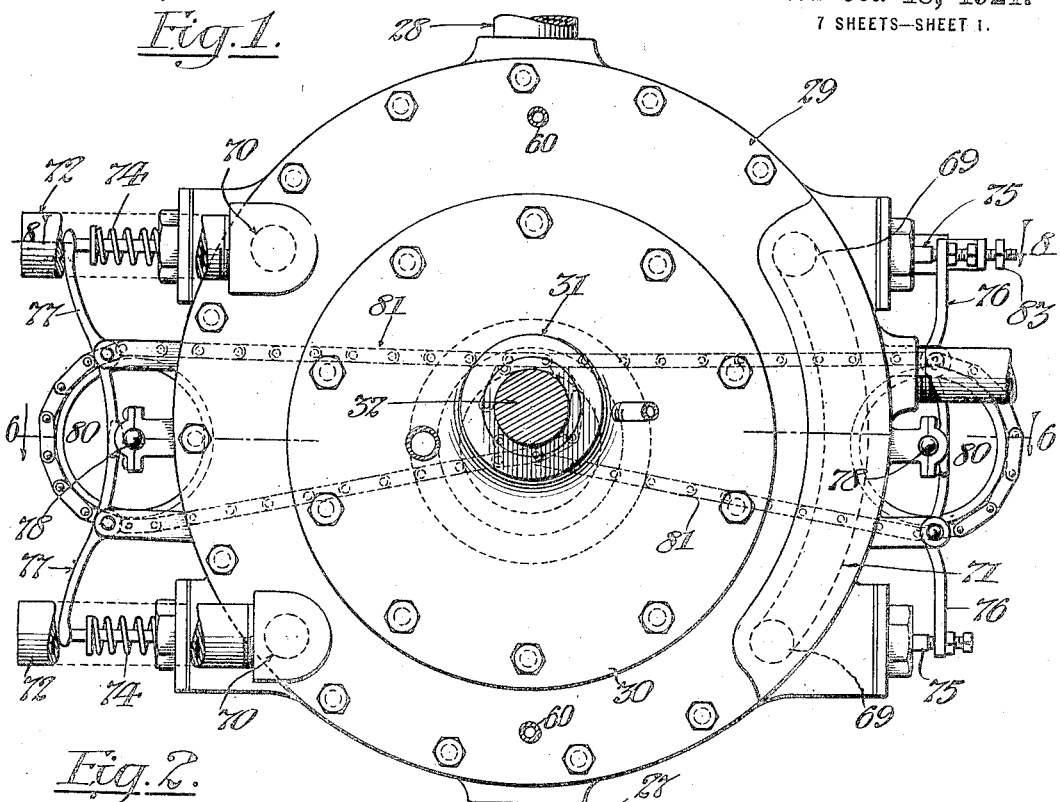
Figure 1 is an end elevation of an internal combustion engine embodying the principle of my invention; the power shaft being indicated in cross-section, and the exhaust pipes being partly broken away.
Figure 2:
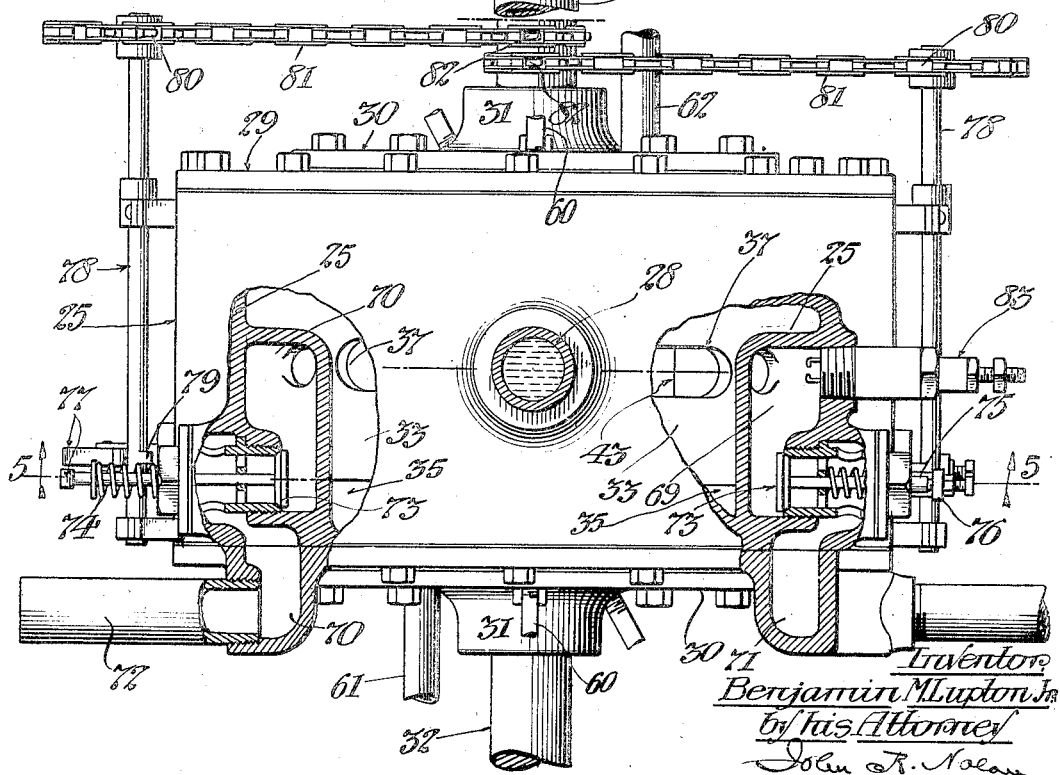
Fig. 2 is a plan, partly in section, of the engine represented in Fig. 1.
Figure 3:
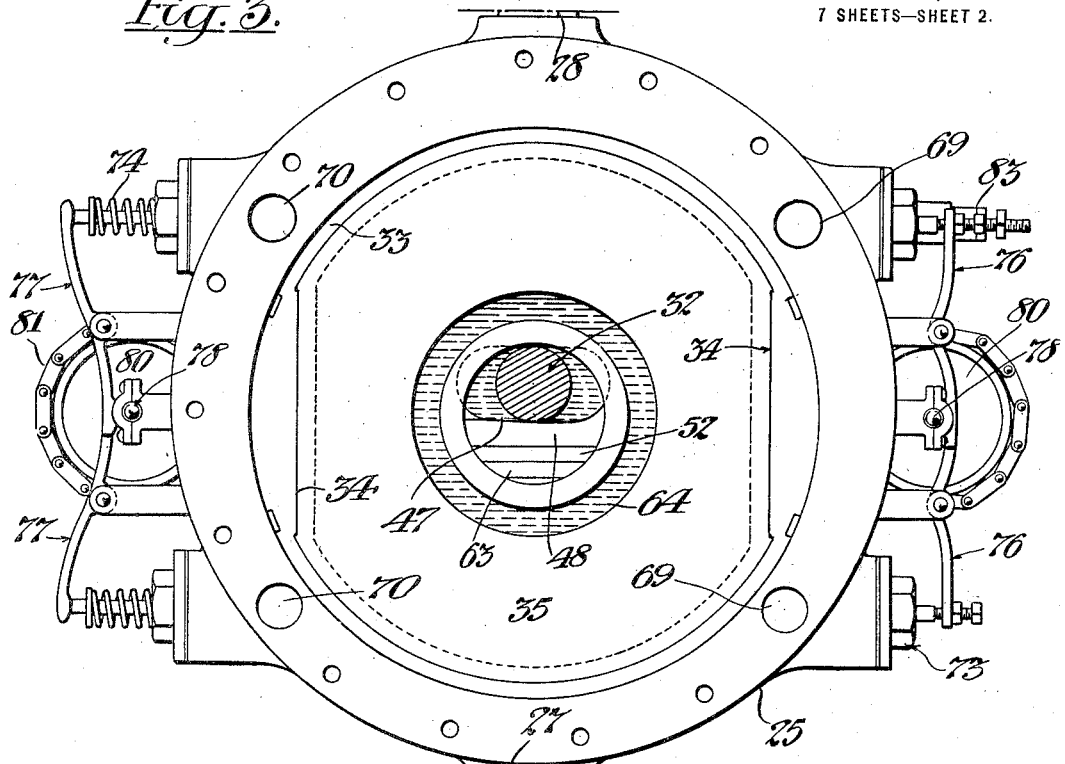
Fig. 3 is a view similar to Fig. 1, but with the casing head removed.
Figure 4:
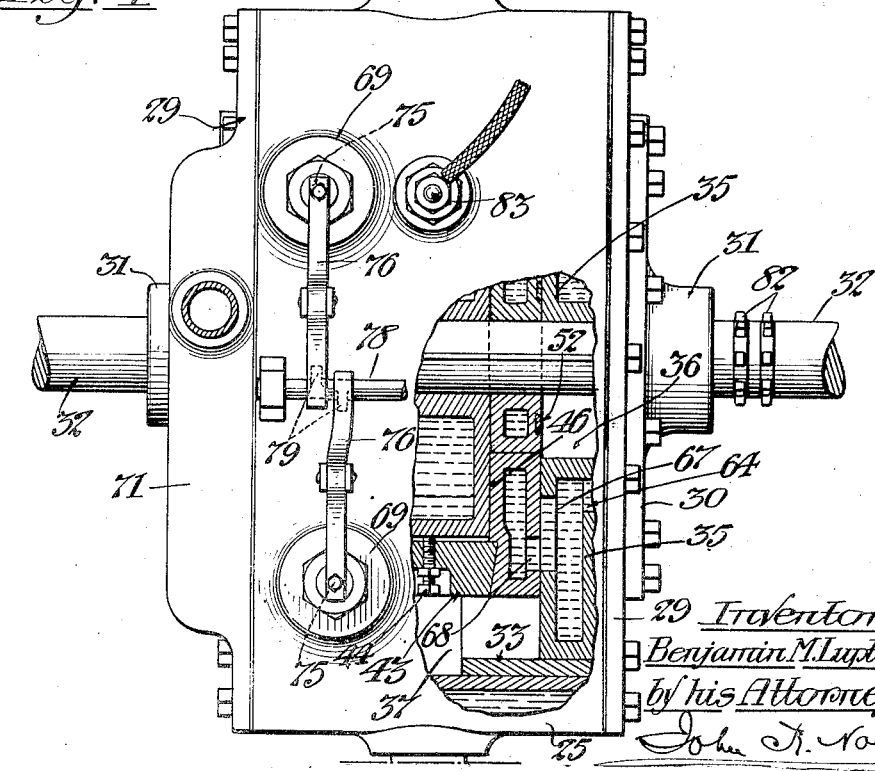
Fig. 4 is an elevation, partly in section, of the right hand side of Fig. 1.

Referring to the internal combustion engine illustrated in Figs. 1 to 13, inclusive, of the drawings, 25 designates a cylindrical end-headed casing comprising, in the present instance, inner and outer cylindrical walls appropriately spaced to provide therebetween a jacket 26 for the reception of water for cooling purposes. The walls are illustrated as arranged in eccentric relation to each other in order to afford a water-space gradually increasing in size from the bottom to the top of the jacket, so that as the water flows from the inlet 27 at the bottom to the outlet 28 at the top of the jacket the body of water is enlarged progressively with its increase of temperature.

The end heads for the casing comprise annular sections 29 and central cap plates 30, the whole being adequately secured together and to the body of the casing. The cap plates have suitable bearings 31 for a power shaft 32 which extends through the casing eccentrically of the interior of the latter, as will presently appear. In virtue of the eccentric arrangement of the jacket walls of the casing this shaft is substantially central of the exterior of the casing, thus contributing to external symmetry.

Within the casing is a rotary piston guide of novel construction. In the present instance this guide comprises a hollow cylinder 33 corresponding substantially in length and diameter to the interior cylindrical wall of the casing to which it is nicely fitted so as to have capacity for free rotary movement relatively to the casing. The inner wall of the cylinder 33 is provided with diametrically-opposite parallel faces 34 which extend from end to end of the cylinder, and constitute internal chord-like guides presenting paths of travel at right angles to the axis of rotation of the cylinder. The parallel guide portions, which are preferably an integral part of the cylinder, may be faced with a hard wear-resisting metal if desired.

The cylinder is provided with end heads 35 disposed in close relation to the inner walls of the adjacent ends of the casing, which heads 35 are encircled by the cylinder 33 and are appropriately shaped to accommodate the internal guide surfaces of the latter. The heads 35 have central openings 36 therethrough for the passage of the shaft, which openings are of suitable size to permit the free rotation of the heads relatively to the eccentrically-located shaft. The heads 35 are preferably hollow as illustrated, for the reception of water, as a cooling agent, from a suitable source of supply as will later appear.

Formed in the wall of the cylinder, in spaced relation to the internal guide surfaces thereof, are suitably-proportioned circumferential slots 37 which provide passages for the periodical admission and discharge of fluid to and from the interior of the cylinder, as, for example, an explosive mixture of gas and air, as will be hereinafter explained.

Mounted on and rotatable with the shaft 32 is a piston comprising a piston body 38 which is fast on the shaft and is adapted in its rotation to approach, but not impinge against, the internal wall of the cylinder. The piston also comprises a member 39 which is mounted to slide in a direction transversely of the body, with the end faces of the member parallel to and in sliding contact with the respective guide surfaces 34 of the cylinder. Hence if the body and, perforce, the sliding member be rotated, the cylinder, in virtue of the sliding connection of the piston member therewith, will be correspondingly rotated, and owing to the eccentricity of the piston body in respect to the cylinder, not only will the chambers therebetween vary progressively in capacity, but the piston member will be moved transversely of the rotary body correspondingly with the variant character of the chambers. In other words, the piston member will be given a compound rotary and sliding motion and, at the same time, the cylinder will be rotated about its own axis, the relative sliding action between the piston member and the guide surfaces of the cylinder enabling the piston member to conform to the eccentric relation of the rotating elements, and this with the minimum friction between the contacting surfaces.

In the present instance the piston body 38 comprises two spaced cylindric segments having parallel inner surfaces 40 which, together with the inner walls of the end heads 35 of the cylinder, provide a guide way extending transversely through the body. These segments having alining transverse openings 41 formed therein in a plane at right angles to and medially intersecting the guide way, which openings are preferably of polygonal form, for the reception of the correspondingly shaped ends of a cross-member 42 which is keyed or otherwise affixed to the shaft. The extremities of this member terminate short of the exterior surfaces of the segments, and the outer ends of the openings are closed by cap-pieces 43 of appropriate external curvature. (See Figs. 5 to 7 inclusive.) In the present instance each of the cap-pieces is a laterally-beveled or dove-tailed block which is slid into a corresponding recess in the segment and is therein held by suitable screws. Preferably spaced securing screws 44, with an intervening thrust screw 45 are provided for each of the cap-pieces. Hence the two pieces and the respective segments may be nicely adjusted longitudinally of the cross-member in proper relation to the shaft and may then be secured in the predetermined positions of adjustment.

The cylindric segments 38 and the cross-member 42 therefor are preferably hollow, the latter being provided in its walls with orifices 42′ for the circulation of water as a cooling agent through the segments and cross-member.

The piston member 39 is of appropriate size and shape to slide snugly within the transverse guide way in the body, and it (the piston member) has a suitable opening 46 therein shaped and positioned to receive the cross member 42 and permit the sliding movement of the piston member in the guide-way, the sides of such opening having elongated apertures 47 for the free passage of the shaft. The portions of the piston member laterally of the central guide opening are preferably hollow to provide chambers for water, as a cooling agent.

The piston member is illustrated as composed of two sections longitudinally movable in relation to each other, in order that the bearing end faces of the member may be nicely adjusted toward and from the parallel guide surfaces of the cylinder in a manner to insure an accurate sliding contact of the abutting surfaces and also to take up wear therebetween, as may be required. The sections are formed with overlapping longitudinal portions 48 which embrace the shaft; pairs of oppositely-disposed wedges 49, adjustable transversely of the piston member, are interposed between inclined faces 50 formed on the respective sections, and connecting screws 51 are applied to the respective wedges of each pair, so that by properly manipulating the screws such wedges may be oppositely adjusted transversely of the piston member, thereby effecting the positioning of the sections with their outer ends in close relation to the respective guide surfaces of the cylinder. (See Figs. 5, 7, 10, 11 and 12.)

The sides and ends of the piston member 39, which contact with the heads 35 and guides 34 respectively, may be grooved for the reception of packing strips 52, if desired. Likewise the cylinder may be provided with circumferential grooves for the reception of appropriate packing rings 53. (See Figs. 7, 8 and 9.) So long as a gas tight connection is maintained therebetween the contacting surfaces of the cylinder and casing, or either of them, may be grooved or otherwise formed in order to reduce the bearing area and accordingly relieve the friction.

As a simple and efficient means to lubricate such contacting surfaces of the guide cylinder and casing and also the corresponding surfaces of the piston member and the internal parallel guides of the cylinder, I utilize as an oil reservoir the chamber formed by the openings 36, 46 and 47 in the cylinder heads and piston, respectively, and conduct the oil from such reservoir to the respective bearing surfaces. In the present instance the oil is introduced to the reservoir through an inlet 54 in one of the end caps 30 of the casing; and tubes 55 conveniently supported in the walls of the chambered sections of the piston member lead from the reservoir to channels 56 in the respective acting faces of the piston member. This member in its reciprocations within the reservoir pumps the oil from the latter through the respective tubes and into the channels in the end faces of the piston member, such faces in their sliding contact with the guide surfaces 34 of the cylinder thus effectually distributing the lubricant thereon. Centrally of each of the guide surfaces is a duct 57 leading from a channel 58 on the face of the guide to a channel 59 on the periphery of the cylinder. This duct is so located that in a part of the movement of the piston member on the guide surface the tube registers with the duct and thus permits the delivery of the oil to the peripheral channel. Thus the oil is supplied to diametrically opposite parts of the periphery of the cylinder, and as a result the bearing surfaces of the latter are well lubricated during its rotation. The shaft bearings may, of course, be readily lubricated from the oil reservoir, and if desired the contacting ends of the cylinder and the inner walls of the annular end portions of the casing may be lubricated by oil introduced through suitably-located inlets 60 therefor in such portions.

The circulation of water for cooling purposes through the hollow sections of the piston member 39, the hollow segments of the piston body 38, the hollow cross-member thereof, and the hollow heads 35 of the guide cylinder, may be accomplished in various ways. In the present example the end caps 30 of the casing are provided adjacent the shaft bearings with inlet and outlet pipes 61, 62, respectively, which communicate with annular channels 63 in the inner faces of the caps, which channels, in turn, communicate with corresponding annular openings 64 in the adjacent walls of the respective heads 35. The opposite or inner walls of these heads 35 are provided with elongated openings 65 adjacent the respective sides of each of the hollow sections of the piston member, said openings being parallel to the guides 34. The sides of the piston member in turn are provided with apertures 66 in register with the respective openings 65, and hence the water is permitted to circulate freely through the cylinder heads 35, the cross-member 42, and the hollow sections of the piston member irrespective of the varying positions of such piston member along the guides. These heads 35 are also provided on their inner walls with suitably-disposed openings 67 which register with apertures 68 in the adjacent walls of the hollow segments of the rotary body 38; such openings 67 being of appropriate form and size to insure communication between the heads and segments irrespective of the varying positions of the latter during their eccentric travel.

To obviate liability of water leakage, packing rings may, if desired, be provided in the region of the apertured portions of the respective walls, as indicated.

The engine thus far described is of the internal combustion type, and hence provision is made for the timely admission of an explosive mixture of air and gas to the interior of the rotating guide cylinder; the compression of the confined mixture; the ignition and expansion thereof, and, finally, the discharge of the waste gases from the cylinder. The circumferential slots 37 in the cylinder constitute inlet and discharge passages of appropriate size and relative location for their intended purpose. In the present instance the slots are comprised in oppositely-disposed arcs of 90° each so as to coöperate at stated intervals of time during the rotation of the cylinder, with valve controlled inlet and exhaust ports 69, 70, respectively, in the engine casing 25.

Two inlet ports 69 in spaced relation to each other are represented on one side of the casing and two similarly spaced exhaust ports 70 are shown on the opposite side of the casing. The inlet ports communicate with and are connected by a channel 71 formed on one of the annular head sections of the casing, which channel, in turn, is connected with a carbureter, or other source of explosive mixture supply; and the exhaust ports communicate with suitably-disposed exhaust pipes 72. All the ports are provided with spring loaded puppet valves 73, the springs 74 of which tend normally to maintain them in closed position; the stems 75 of the valves projecting outwardly of the casing and being periodically actuated and controlled by any suitable mechanism in order to effect the automatic opening and closing of the ports during the operation of the engine. The typical valve actuating means illustrated comprises two pairs of levers 76, 77 fulcrumed in bearing brackets at the respective sides of the casing, the outer ends of one pair of levers bearing against the stems of the inlet valves and the corresponding ends of the other pair bearing against the stems of the exhaust valves. The inner arms of each pair of levers extend in close relation to a cam shaft 78 having its bearings in brackets on the adjacent end of the casing, the wiper or cam members 79 on said shaft being arranged to co-act with the adjacent levers in order to open their associated valves in successive order. Each of the shafts bears a sprocket wheel 80 which is connected by means of a chain 81 with a sprocket wheel 82 on the engine shaft 32, whereby during the operation of the latter the two cam shafts 78 are simultaneously driven. The ratio of the gearing is as two to one in order that the shafts 78 shall be driven at one-half the speed of the engine shaft, and the two wiper or cam members on each shaft 78 are arranged at 90° (degrees) part in order to operate at proper intervals of time in relation to the position of the cylinder and piston, as will presently appear.

Any appropriate means for igniting the explosive mixture may be employed. In the present instance such means includes a spark plug 83 of ordinary character which is screwed into the casing, laterally of the upper inlet port, so as to produce through the instrumentality of any usual or approved electric controlling devices an ignition spark at a point in proximity to the path of each circumferential port of the cylinder in its travel adjacent said inlet port; the mixture thus presented to the spark for ignition and consequent explosion and expansion being effectually compressed within the chamber formed above the piston as will now be described.

Figure 5:
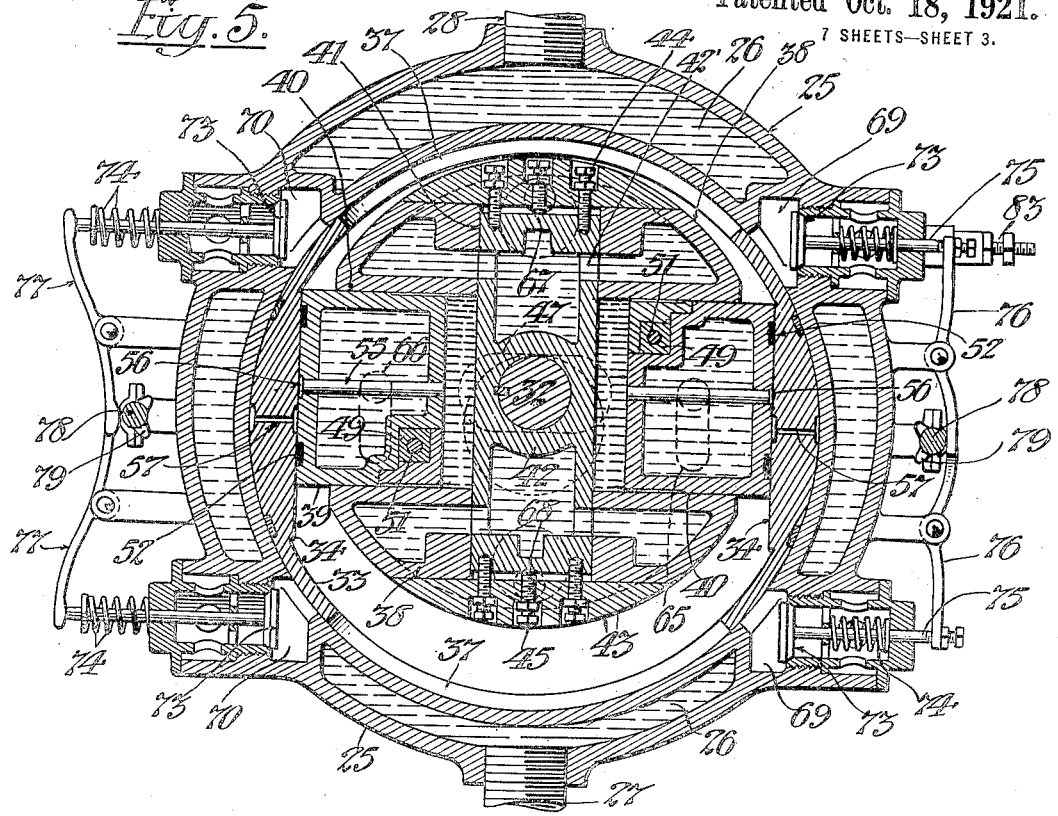
Fig. 5 is a vertical section, as on the line 5—5 of Fig. 2.
Figure 6:
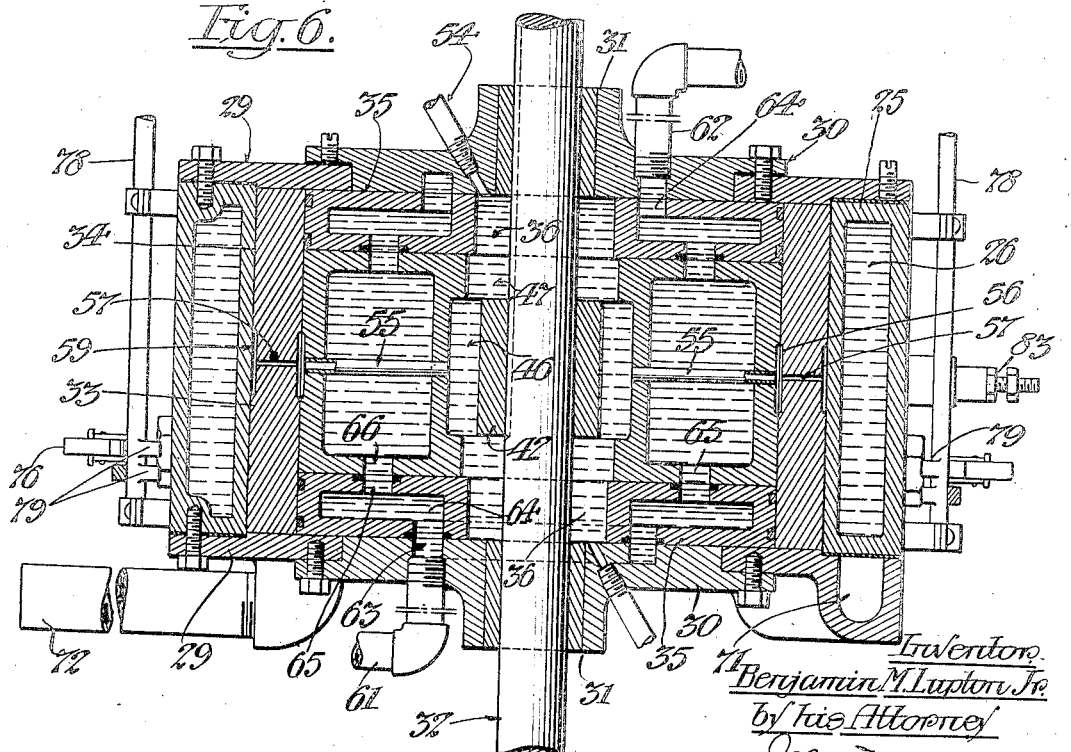
Fig. 6 is a horizontal section, as on the line 6—6 of Fig. 1.

Referring to Fig. 5 of the drawings, it will be observed that the sliding piston member is in horizontal position, thus producing within the cylinder, above and below the piston, relatively small and large chambers respectively. The piston is thus at the point of greatest compression; and, assuming gas and air to have been previously introduced to the cylinder, the mixture is efficiently compressed within the upper chamber. At this stage the circumferential passages in the guide cylinder are closed by the contiguous wall of the casing. By moving the piston and its adjuncts slightly to the right, the degree of compression is not appreciably disturbed, but the resulting slight extension of the sliding piston member to the right (due to the eccentric mounting of the rotary body as above explained) disposes the balance of power, so to say, on the right hand side of the engine shaft. At this point, or approximately so, (the then upper circumferential slot in the cylinder being in communication with the spark plug,) the gas is ignited and exploded, thereby expanding and exerting a turning effort on the right hand portion of the piston and, perforce, rotating the same and its complementary moving parts, including the engine shaft, in a clock-wise direction.

The extension of the rotating piston member progresses until the maximum limit is reached at the vertical, whereupon the piston member gradually recedes until it reaches the horizontal. In the meantime a mixture previously introduced to a chamber at the right hand of the cylinder by way of the inlet valves, has been carried to and compressed in the upper part of the cylinder by the traveling piston; or if the chamber should have contained waste gases they have been driven through the exhaust ports on the left hand side of the casing, excepting the comparatively small excess remaining in the cylinder and ports. The amount of this excess depends, of course, on the capacity of the compression space, the size of which is determined by the degree of eccentricity of the piston body in relation to the cylinder, the effective width of the sliding piston member, and the area of the ports.

It is to be noted that the sliding piston member makes two complete reciprocations during its rotation, and hence it is necessary when using rotary valve-actuating cams to impel them at one-half the speed of the engine shaft, and also to set the two operative points of each cam at 90° degrees apart as above described.

For a better understanding of the working of the typical engine hereinbefore described I have illustrated conventionally in Fig. 13 various sequential phases in the operation of the piston and its correlated parts, that is to say—

Diagram A indicates the parts in the relative positions which they occupy preparatory to an initial charge of explosive mixture to the adjacent chamber by way of the inlet port at the upper right-hand part of the casing. In this phase (which may for convenience be termed the first phase,) the slidable piston member is horizontal; the upper inlet port is open; the lower inlet port is closed; the lower exhaust port is open, and the upper exhaust port is closed. The open exhaust port at the lower left hand part of the casing performs no particular function at this initial stage, except as a vent for the confined air, but in subsequent operations it permits the escape of waste gases, as will presently appear.

Diagram B indicates the parts in the relative positions which they occupy upon the completion of a quarter-turn of the piston. In this second phase the sliding piston member is vertical; the upper inlet port is closed; the lower inlet port is open for a continuation of the charge of explosive mixture to the chamber of progressively increasing capacity at the right, the lower exhaust port is closed, and the upper exhaust port is open. The remarks as to the open exhaust port in diagram A are applicable to the open exhaust port in diagram B.

Diagram C indicates the parts in the relative positions which they occupy upon the completion of the second quarter-turn of the piston. In this third phase, the sliding piston member is horizontal; the upper inlet port is open for the admission of explosive mixture; and all the remaining ports are closed. Hence the gas previously admitted in phases A and B is confined in the large chamber indicated between the lower portion of the cylinder and the piston.

Diagram D indicates the parts in the relative positions which they occupy upon the completion of the third quarter-turn of the piston. In this fourth phase the sliding piston member is vertical; the lower inlet port is open for a continuation of the charge of explosive mixture, and all the remaining ports are closed. Hence the gas previously admitted in phases A and B is partly compressed in the contracted chamber formed at the left of the cylinder.

Diagram E indicates the parts in the relative positions which they occupy upon the completion of the rotation of the piston. In this fifth phase the sliding piston member is horizontal and all the valves are closed. Hence the gas previously admitted in phases A and B is fully compressed in the still further contracted space in the upper portion of the cylinder, and is in condition for ignition, while the gases admitted in phases C and D are confined in the larger chamber between the lower portion of the cylinder and the piston. Immediately preceding the ignition the sliding piston member is carried slightly beyond the horizontal, as previously mentioned, and as indicated in the diagram F which may be regarded as inclusive of the fifth phase. Diagram F thus indicates the parts in the relative positions which they occupy at the instant of igniting the fully compressed mixture.

Diagram G indicates the parts in the relative positions which they occupy during the expansion of the mixture. In this sixth phase the sliding piston member has assumed a vertical position, and all the valves remain closed; the expansion being affected in the right hand chamber and part compression in the left hand chamber.

Diagram H indicates the parts in the relative positions which they occupy at the instant of the second explosion which is affected by the ignition of the now fully compressed gas in the top chamber. In this seventh phase the piston member is slightly inclined to the horizontal (as in diagram F), the lower exhaust port is open for the escape from the large bottom chamber of waste gases therein resulting from the immediately preceding explosion, and the remaining ports are closed.

Diagram I indicates the parts in the relative positions which they occupy during the expansion of the mixture ignited in phase H. In this eighth phase the piston member is vertical; the upper exhaust port being open for a continuation of the escape of waste gases not previously expelled through the lower exhaust port, the remaining ports being closed; and the expansion being effected in the right hand chamber.

Upon the completion of the eighth phase the parts assume successively the preceding positions indicated at A and B; the waste gases, however, being discharged through the lower and upper exhaust ports. Thereafter in the operation of the engine the piston and its correlated elements are caused to assume in continuous succession the relative positions or phases above indicated.

Figure 14:
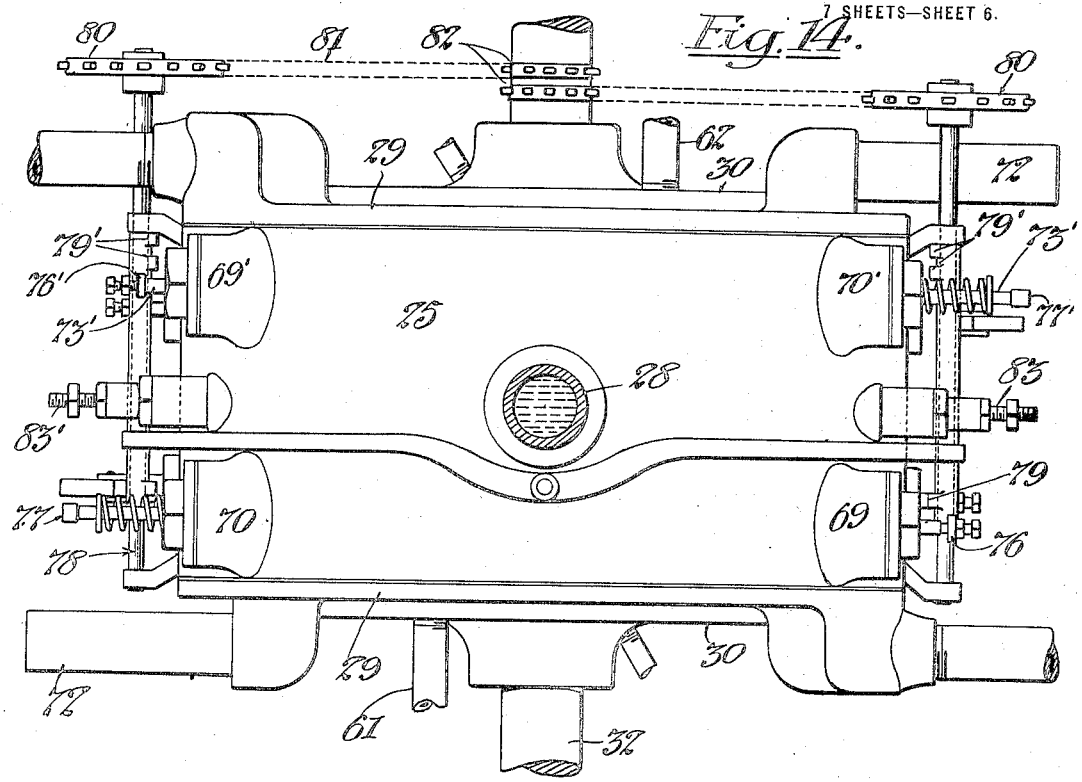
Fig. 14 is a sectional plan of the same engine as equipped with reversing mechanism.
Figure 15:
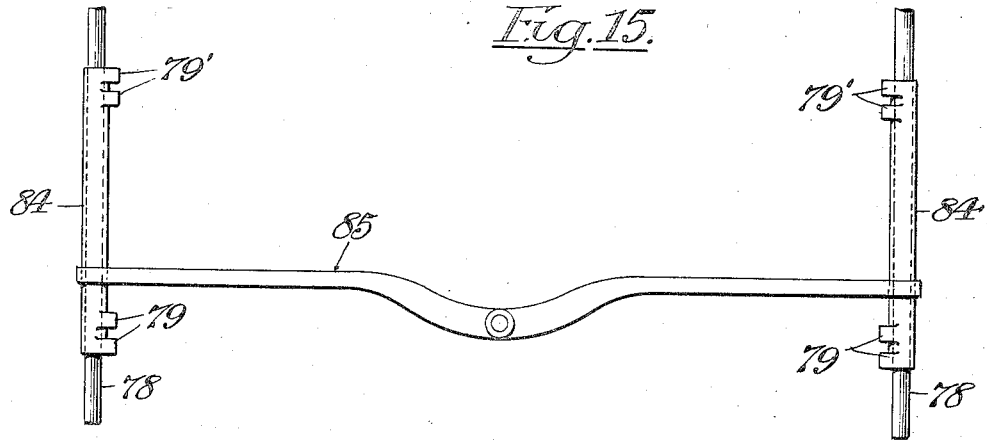
Fig. 15 is a plan of cam devices, and adjuncts, for controlling the operation of the valves which determine the forward or the reverse running of the engine.

The foregoing described engine is designed to travel in one direction, i. e. forward or clockwise. But the engine may be readily made reversible, as, for example, by the provision of an extra set of inlet and exhaust ports in the casing, arranged in opposite order to the set illustrated, an extra set of valves and actuating cams therefor, and an extra spark plug, together with appropriate shifting mechanism for throwing either set of cams into or out of operation as desired. Such a reversible type of engine is illustrated in Figs. 14 and 15 of the drawings, wherein 69′ and 70′ designate the additional upper inlet and exhaust ports respectively; 73′, 73′ the respective valves therefor; 79′ the extra sets of cams for actuating the extra valve levers 76′, 77′, which cams, together with the cams 79, are mounted on sleeves 84 that are keyed on the respective shafts 78 so as to be slidable longitudinally of, though rotatable with, the latter. 83′ designates the additional spark plug.

The cam sleeves are connected with the respective arms of a bifurcated shifting lever 85 by the operation of which the sleeves may be simultaneously shifted longitudinally of their shafts in order to set and temporarily hold either set of cams in idle or active position, and thus effect the operation of either set of valves, as desired, for right or left hand running.

It is to be understood that the particular reversing mechanism just described is for exemplification purposes only.

My invention contemplates a plural arrangement of the power units of the engine, that is to say, two or more hollow guide cylinders 33 with their complementary piston elements 38, 39 may be arranged in endwise relation to each other on the engine shaft, with a suitable internal bearing ring or rings for the adjacent ends of succeeding units, and with a separate set of inlet and exhaust ports and a separate spark plug, for each unit. In Figs. 16 and 17 I have illustrated an engine in which two units are associated as above mentioned.

In this construction the end heads (35) are omitted from the co-axial guide cylinders 33 and the eccentric piston bodies 38 are provided at their respective outer ends with supporting heads 86 and at their inner or adjacent ends with a common supporting head 87, which heads are concentric with the piston bodies, and are mounted to turn in suitably-spaced annular bearings.

The bearings for the inner head 87 are provided by a ring 88 suitably positioned within the casing, and the bearings for the outer heads 86 are formed in the respective end heads of the casing; the supporting heads 86 and 87 being spaced and connected, as, for example, by suitably-disposed screw rods 89, as shown.

The casing is provided with pairs of ports (inlet 69 and outlet 70) in spaced relation to each other, (together with their complementary valves and levers) for each unit, and the cam shafts are provided with suitably-disposed cams for the respective levers of each unit; there being, as above indicated, a sparking device 83 for each unit. The number of power units may be increased if desired, in which case, of course, additional internal rings and heads will be provided for the adjacent ends of successive guide cylinders, and complementary inlet and exhaust ports, valves, valve actuating mechanism and a spark plug, will be arranged in coöperative relation to each unit as previously described.

I have illustrated the outer heads of the piston bodies as chambered and in communication, through ports 90, with the adjacent ends of the hollow portions of the piston bodies, such portions communicating with each other through ports 91 in the central supporting head. A hollow power shaft 32′ having ports 92 opening into the chambers of the respective end heads 86 is represented, whereby water, for cooling purposes, can be supplied to and circulated through the respective heads and piston bodies.

In Figs. 18 and 19, I have shown my invention as embodied in a valveless motor or pump. In this typical construction four spaced ports are arranged in pairs in the wall of the casing, one pair being designated 69 and the other pair 70. When the piston elements are running forward, i. e. to the right, ports 69 constitute suction or intake ports and the left hand ports 70 constitute pressure or outlet ports. When, however, the piston elements are running backward, i. e. to the left, the functions of the ports are reversed. In the specific construction illustrated, the sliding piston 39 is shown as composed of two sections which are adjustable in relation to the respective end heads of the casing by means of suitably-disposed connecting screws 93 to the heads of which access may be had through apertures in one of the end members of the eccentric piston body 38 which, in this instance, is represented as solid.

The construction just described may be operated through the agency of air, steam or liquid in order to perform the function of a motor; or the shaft may be driven by an external force and the apparatus thus perform the function of a pneumatic or a hydraulic pump. In any such case the use of valves for the respective ports is unnecessary, (although, of course, auxiliary valves may be employed if desired) as the slots 37 in the guide cylinder 33 allow for the admission and exhaust of the fluid; while the ports 69, 70 and the wall of the cylinder beyond the slots perform the function of cut-offs. The length of the slots, and the relative positions of the coöperating elements are such that no two ports of opposite function are open at the same time to the same side of the piston. When the cut-off of one port is effected the port of opposite function is open, and for continuity of admission or exhaust two ports of the same function are spanned. For example, in Fig. 18 the slots 37 are in the position where neither admission nor exhaust can take place, but on moving the cylinder to the right or to the left, such slots communicate with the adjacent ports of opposite function in their path; and when the cylinder has been advanced, say one-fourth rotation, the slots connect two ports of like function with each other.

When the apparatus is used as a steam engine or motor the steam inlet space should be as small as possible, and there should be ample provision for expansion in order to conserve the heat of the steam. Therefore in embodying my invention in such an engine or motor the design should insure the minimum eccentricity of the piston body consistent with efficient operation.

In the case of an air compressor or pump it is advisable to provide for water-cooling spaces in the working parts in order to take care of the heat incident to the compressing operation.

The rotary units of the structure just described may, if desired, be arranged in sets as previously explained with respect to the corresponding units of the internal combustion engine.

While I have herein shown and described several constructions illustrative of practical applications of my invention, it is to be understood that I do not limit myself to the particular forms or means disclosed as the same may be modified in various respects within the principle of my invention and the scope of the appended claims; thus, for example, I have herein represented as a casing the supporting element for the rotary piston and its correlated guide cylinder, but my invention contemplates the provision of any other appropriate form of support for the piston and cylinder. Furthermore the relative compound rotary and sliding motion between the eccentrically-mounted piston and the parallel guide element therefor, may be effected by and through the bodily rotation of the latter.

I claim—

1. In a rotary engine, a support, a rotatable element mounted thereon and having a peripheral portion supported thereby, the axis of rotation of said element being centrally of the element, a piston comprising a body mounted to rotate within and in eccentric relation to said element and a piston member carried by and movable transversely of said body, with the respective ends of said member in parallel sliding connection with said element, whereby combined rotary and reciprocative motion of said member is effected during the relative rotation of said element and piston, and chambers of varying capacities are thereby regularly and progressively formed throughout the cycle of rotation, and provision, including inlet and outlet ports in spaced relation to each other, for the admission and discharge of a fluid to and from said chambers at predetermined intervals.

2. In a rotary engine, a support, a rotatable element mounted thereon and having a peripheral portion supported thereby, the axis of rotation of said element being centrally of the element and the inner wall of said element having parallel guides at right angles to said axis, a piston comprising a body mounted to rotate within and in eccentric relation to said element, and a piston member carried by and movable transversely of said body, with the respective ends of said member in sliding contact with said guides, whereby combined rotary and reciprocative motion of said member is effected during the relative rotation of said element and piston, and chambers of varying capacities are thereby regularly and progressively formed throughout the cycle of rotation, and provision, including inlet and outlet ports in spaced relation to each other, for the admission and discharge of a fluid to and from said chambers at predetermined intervals.

3. In a rotary engine, a support, an element mounted for relative rotation thereon, provision for the admission and discharge of a fluid, a piston body mounted for rotation relatively to the support and eccentrically of said element, a sectional piston member mounted to slide in said body transversely thereof with the respective ends of said element in parallel sliding connection with said element, and means for adjusting the sections of said member longitudinally thereof.

4. In a rotary engine, a support, a cylinder mounted for relative rotation thereon having internal parallel guides at right angles to the axis of rotation, provision for the admission and discharge of a fluid, a piston body mounted for rotation relatively to said support and eccentrically of said cylinder, a sectional piston member mounted to slide in said body transversely thereof with the respective ends of said member in sliding contact with said guides, and means for adjusting the sections of said piston member in relation to the guides.

5. In a rotary engine, a casing having fluid inlet and discharge ports in spaced relation to each other, a cylinder mounted for relative rotation within said casing having circumferential ports communicable with said inlet and outlet ports and also having internal parallel guides at right angles to the axis of rotation, a piston body mounted for rotation relatively to said casing and eccentrically of said cylinder, and a piston member mounted to slide in said body transversely thereof with the respective ends of said member in sliding contact with said guides.

6. In a rotary engine, a casing having pairs of fluid inlet and discharge ports in spaced relation to each other, valve mechanism for the respective ports, a cylinder mounted for relative rotation within said casing having circumferential ports communicable with said inlet and outlet ports and also having internal parallel guides at right angles to the axis of rotation, a rotary piston body mounted for rotation relatively to said casing and eccentrically of said cylinder, and a piston member mounted to slide in said body transversely thereof with the respective ends of said member in sliding contact with said guides.

7. In a rotary engine, a casing having a cylindrical bore and provision for the admission and discharge of a fluid, a piston body mounted for relative rotation within and eccentrically of said bore, a piston member carried by and movable transversely of said body, and an element mounted for relative rotation within and concentrically of said bore, having parallel guides with which the respective ends of the said piston member are in sliding contact.

8. In a rotary engine, a casing having a cylindrical bore and provision for the admission and discharge of a fluid, a piston body mounted for relative rotation within and eccentrically of said bore, a sectional piston member carried by and movable transversely of said body, an element mounted for relative rotation within and concentrically of said bore, having parallel guides with which the respective ends of the said piston member are in sliding contact, and means for adjusting the sections of said piston member in relation to the guides.

9. In a rotary internal combustion engine, a casing having pairs of fluid inlet and discharge ports in spaced relation to each other, valve mechanism for the respective ports, a cylinder mounted for relative rotation within said casing having circumferential passages communicable with said inlet and outlet ports and also having internal parallel guides at right angles to the axis of rotation, a piston comprising a body mounted for rotation relatively to said casing and eccentrically of said cylinder and a piston member mounted to slide in said body transversely thereof with the respective ends of said member in sliding contact with said guides, and ignition means communicable with the cylinder through its circumferential passages at predetermined intervals.

10. In a rotary internal combustion engine, a supporting element, a cylinder thereon having a central axis of rotation, a piston comprising a body mounted for rotation eccentrically of said cylinder and a member mounted to slide in said body transversely thereof, with the respective ends of said member in parallel sliding connection with the interior of the cylinder, whereby during the rotation of said cylinder and piston combined rotary and reciprocative motion of said member is effected and compression and expansion chambers are thereby regularly and progressively formed between said cylinder and piston throughout the cycle of rotation, means, including ports and valves therefor, whereby an explosive mixture is periodically supplied to said chambers and therein compressed, spark means for igniting the compressed mixture, and means, including ports and valves therefor, for permitting the periodical escape of the waste gases.

11. In a rotary internal combustion engine, a supporting element, a cylinder mounted for relative rotation thereon, a piston comprising a body mounted for rotation relatively to said element and eccentrically of said cylinder and comprising also a member mounted to slide in said body transversely thereof, with the respective ends of said member in parallel sliding connection with the interior of said cylinder, whereby during the rotation of the piston and cylinder the chambers therebetween progressively vary in capacity, means whereby an explosive mixture is periodically introduced at succeeding points to one of said chambers in a part of the rotation of the piston and cylinder, means for igniting the compressed mixture in the chamber in another part of such rotation, and means whereby the waste gases are permitted periodically to escape at two succeeding points from said chamber during another part of such rotation.

12. In a rotary engine, a casing having a cylindrical bore and provision for the admission and discharge of a fluid, a shaft extending through said bore eccentrically thereof, a cross-member fast on said shaft, cylindric segments carried by said cross-member in spaced relation to each other, a piston member slidable between said segments, and an element mounted for relative rotation within and concentrically of the bore, having diametrically opposite parallel guides with which the respective ends of the said piston member are in sliding contact.

13. In a rotary engine, a casing having a cylindrical bore and provision for the admission and discharge of a fluid, a shaft extending through said bore eccentrically thereof, a cross-member fast on said shaft, cylindric segments mounted on said cross-member and adjustable thereon toward and from the shaft, means for securing said segment in positions of adjustment, a piston member slidable between said segments, and an element mounted for relative rotation within and concentrically of said bore, having parallel guides with which the respective ends of the said piston member are in sliding contact.

14. In a rotary engine, a casing having a cylindrical bore and provision for the admission and discharge of a fluid, a shaft extending through said bore eccentrically thereof, a cross-member fast on said shaft, cylindric segments having transverse openings therein for the reception of the respective ends of the cross-member, a piston member slidable between said segments, external cap-pieces for the openings in the respective segments, and an element mounted for relative rotation within and concentrically of said bore, having parallel guides with which the respective ends of the said piston member are in sliding contact.

15. In a rotary engine, a casing having a cylindrical bore and provision for the admission and discharge of a fluid, a shaft extending through said bore eccentrically thereof, a cross-member on said shaft, cylindric segments having transverse openings therein for the reception of the respective ends of the cross-member and also having peripheral locking channels intersecting said openings, cap-pieces fitted to said channels, securing screws between said cap-pieces and the respective segments, thrust screws between said cap-pieces and the respective ends of the cross-member, and an element mounted for relative rotation within and concentrically of said bore, having parallel guides with which the respective ends of the said piston member are in sliding contact.

16. In a rotary engine, a casing, a rotary cylinder mounted therein to turn on a central axis, said cylinder having internal parallel guides at right angles to its axis of rotation and also having provision for the admission and discharge of a fluid, a piston body mounted to rotate within said casing and eccentrically of said cylinder, a piston member mounted to slide in said body transversely thereof with the respective ends of said member in sliding contact with the said guides, and means for supplying a lubricant between the contacting surfaces of the piston member and guides.

17. In a rotary engine, a casing, a rotary cylinder therein having internal parallel guides at right angles to its axis of rotation and also having provision for the admission and discharge of a fluid, a shaft extending through said casing parallel to and eccentrically of the cylinder, a piston body fast on said shaft, a piston member slidingly carried by said body transversely thereof and having sliding contact with said guides, said piston member having an opening therein constituting an oil reservoir and having ducts leading from said reservoir to the contact surfaces of the piston member and guides.

18. In a rotary engine, a casing, a rotary cylinder therein having internal parallel guides at right angles to its axis of rotation and also having provision for the admission and discharge of a fluid, a shaft extending through said casing parallel to and eccentrically of the cylinder, a piston body including a cross-piece fast on said shaft, a piston member slidingly carried by said body transversely thereof, said member having an opening therein constituting an oil reservoir through which the said cross-piece freely extends, and also having ducts leading from said reservoir to the contact surfaces of the piston member and guides.

19. In a rotary engine, a casing, a rotary cylinder therein having internal parallel guides at right angles to its axis of rotation and also having provision for the admission and discharge of a fluid, a piston body mounted to rotate within said casing and eccentrically of said cylinder, a piston member mounted to slide in said body transversely thereof with the respective ends of said member in sliding contact with the said guides, said piston member having an opening therein constituting an oil reservoir and having ducts leading from said reservoir to the contact surfaces of the piston member and the parallel guides on the cylinder, and said cylinder having ducts extending from the guides to the circumference of the cylinder, said latter ducts being in the path of the ducts leading from the oil reservoir.

20. In a rotary engine, a casing, a rotary cylinder therein having internal parallel guides at right angles to the casing and also having provision for the admission and discharge of a fluid, a rotary shaft extending through said casing parallel to and eccentrically of the cylinder, a chambered piston body fast on said shaft, a chambered piston member slidingly carried by said body transversely thereof and having sliding contact with the said guides, the said piston body and member having intercommunicating passages for a cooling agent, and the said member having between its chambers an opening constituting an oil reservoir, and tubes leading from said reservoir through the respective chambers of the piston member to the contact surfaces of said member and guides.

21. In a rotary engine, a casing, a rotary cylinder therein having provision for the admission and discharge of a fluid, said cylinder having chambered end heads, means for supplying cooling liquid to the interior of said heads during the rotation of the cylinder, a piston body mounted to rotate within said casing and eccentrically of said cylinder, and a piston member carried by and movable transversely of said body, said member having parallel sliding connection with the cylinder.

22. In a rotary engine, a casing, a rotary cylinder therein having provision for the admission and discharge of a fluid, a chambered piston body mounted to rotate within said casing and eccentrically of said cylinder, means for supplying cooling liquid to the interior of said body during the rotation of the latter, and a piston member carried by and movable transversely of said body, said piston having parallel sliding connection with the cylinder.

23. In a rotary engine, a casing, a rotary cylinder therein having provision for the admission and discharge of a fluid, a piston body mounted to rotate within said casing and eccentrically of said cylinder, a chambered piston member carried by and movable transversely of said body, said piston having parallel sliding connection with the cylinder, and means for supplying cooling liquid to the interior of said piston member during its compound rotary and sliding motion.

24. In a rotary engine, a casing, a rotary cylinder therein, having provision for the admission and discharge of a fluid, said cylinder having chambered end heads, a chambered piston body mounted to rotate within said casing and eccentrically of said cylinder, and a chambered piston member carried by and movable transversely of said body, said member having parallel sliding connection with the cylinder, and the chambers of said heads, body and member being in intercommunication for the circulation of a cooling liquid therethrough during the operation of the engine.

25. In a rotary engine, a casing, a rotary cylinder mounted therein having provision for the admission and discharge of a fluid, said cylinder having chambered end heads provided with openings in their inner walls, a chambered piston body mounted to rotate within said casing and eccentrically of said cylinder, and in close relation to the inner walls of the chambered end heads, the end walls of said body having apertures in register with said openings, a piston member carried by and movable transversely of said body, and having parallel sliding connection with the cylinder, and means for supplying water to at least one of said end heads.

26. In a rotary engine, a casing having end caps provided with recesses in their inner sides, a rotary cylinder mounted in said casing having provision for the admission and discharge of a fluid, said cylinder having chambered end heads provided with openings in their inner and outer walls, those in the outer walls being in register with the recesses in the adjacent end caps, a chambered piston body mounted to rotate within said casing and eccentrically of said cylinder and in close relation to the inner walls of the chambered end heads of the latter, the end walls of said body having apertures in register with the openings in the inner walls of the cylinder heads, a piston member carried by and movable transversely of said body and having parallel sliding connection with the cylinder, and means for supplying water to at least one of the end caps of the casing.

27. In a rotary engine, a casing, a rotary cylinder mounted therein having provision for the admission and discharge of a fluid, said cylinder having chambered end heads provided with openings in their inner walls, a piston body mounted to rotate within said casing and eccentrically of said cylinder, a chambered piston member carried by and movable transversely of said body and having parallel sliding connection with the cylinder, the end walls of said member being in close relation to the inner walls of the chambered end heads and having apertures in register with the openings in said inner walls, and means for supplying water to at least one of said end heads.

28. In a rotary engine, a casing having end caps provided with recesses in their inner sides, a rotary cylinder mounted in said casing having provision for the admission and discharge of a fluid, said cylinder having chambered end heads provided with openings in their inner and outer walls, those in the outer walls being in register with the recesses in the adjacent end caps, a piston body mounted to rotate within said casing and eccentrically of said cylinder, a chambered piston member carried by and movable transversely of said body and having parallel sliding connection with the cylinder, the end walls of said member being in close relation to the inner walls of the chambered end heads and having apertures in register with the openings in said inner walls, and means for supplying water to at least one of the recessed portions of said end heads.

29. In a rotary engine, a casing, a rotary cylinder mounted therein having provision for the admission and discharge of a fluid, said cylinder having chambered end heads provided with spaced openings in their inner walls, a chambered piston body mounted to rotate within said casing and eccentrically of said cylinder and in close relation to the inner walls of the chambered end heads, the end walls of said body having apertures in register with adjacent openings in the inner walls of the cylinder heads, a chambered piston member carried by and movable transversely of said body and having parallel sliding connection with the cylinder, the end walls of said member being in close relation to the inner walls of the chambered end heads and having apertures in register with adjacent openings in said inner walls, and means for supplying water to at least one of said end heads.

30. In a rotary engine, a casing having end caps provided with recesses in their inner sides, a rotary cylinder mounted in said casing having provision for the admission and discharge of a fluid, said cylinder having chambered end heads provided with openings in their inner and outer walls, those in the outer walls being in register with the recesses in the adjacent sides of the end caps, a chambered piston body mounted to rotate within said casing and eccentrically of said cylinder and in close relation to the inner walls of the chambered end heads of the latter, the end walls of said body having apertures in register with adjacent openings in the inner walls of the cylinder heads, a chambered piston member carried by and movable transversely of said body and having parallel sliding connection with the cylinder, the end walls of said member being in close relation to the inner walls of the chambered end heads and having apertures in register with adjacent openings in said inner walls, and means for supplying water to the recessed portion of at least one of said end caps.

Signed at New York, in the State of New York, this 19th day of December, A. D. 1916.

BENJAMIN M. LUPTON, Jr.